United States Patent [19]

Reed et al.

[11] Patent Number: 5,476,162

[45] Date of Patent: Dec. 19, 1995

[54] FORWARD CONTROL FOR MOTORCYCLE REAR BRAKES

[75] Inventors: John Reed; Ignatius J. Panzica, both of Morgan Hill, Calif.

[73] Assignee: Custom Chrome, Inc., Morgan Hill, Calif.

[21] Appl. No.: 360,201

[22] Filed: Dec. 20, 1994

[51] Int. Cl.$^6$ ..................................................... B60T 13/10
[52] U.S. Cl. ..................... 188/344; 303/9.64; 92/161.5; 92/163
[58] Field of Search ................................. 188/72.1, 106 F, 188/141, 344, 345; 74/512; 180/219; 280/291; 303/9.62, 9.64; 60/533; 92/161, 161.5, 163

[56] References Cited

U.S. PATENT DOCUMENTS

| | | | |
|---|---|---|---|
| 4,176,886 | 12/1979 | Watanabe | 188/344 |
| 4,465,322 | 8/1984 | Hayashi | 303/9.64 |
| 4,494,800 | 1/1985 | Hayashi | 303/9.64 |
| 4,865,164 | 9/1989 | Kaneda | 188/141 |
| 4,924,673 | 5/1990 | Barker et al. | 92/161 |

OTHER PUBLICATIONS

1994 Custom Chrome Catalog, pp. 90–93.

*Primary Examiner*—Robert J. Oberleitner
*Assistant Examiner*—Chris Schwartz
*Attorney, Agent, or Firm*—Flehr, Hohbach, Test, Albritton & Herbert

[57] ABSTRACT

A motorcycle forward control for rear brakes. A housing internally carries a brake cylinder unit comprising a cylindrical chamber in which a plunger is operated through a linkage from a brake pedal. Pressurized brake fluid is directed from the cylinder through an internal channel in the housing along a path which exits through the rear of the housing and into a brake line leading to the rear brakes. The operating linkage includes a clevis-shaped lever which applies thrust forces evenly along the thrust axis of the plunger. A footrest is mounted on the housing with the provision being made for adjusting both vertical and laterally tilt positions of the footrest for rider comfort.

6 Claims, 4 Drawing Sheets

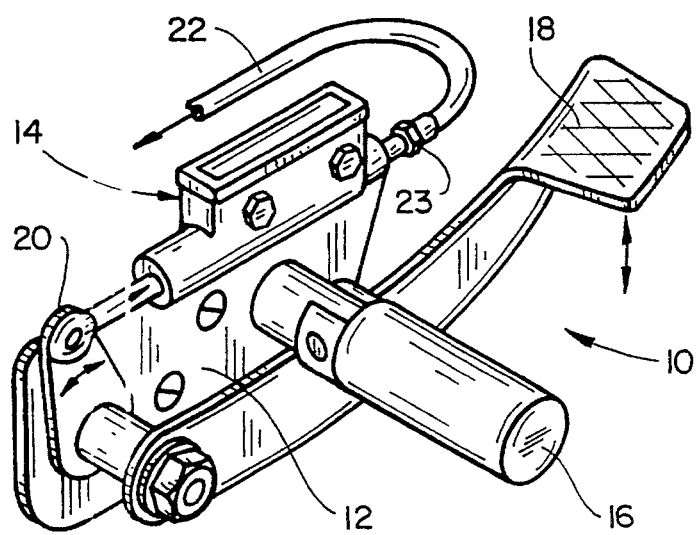
FIG_1
(PRIOR ART)
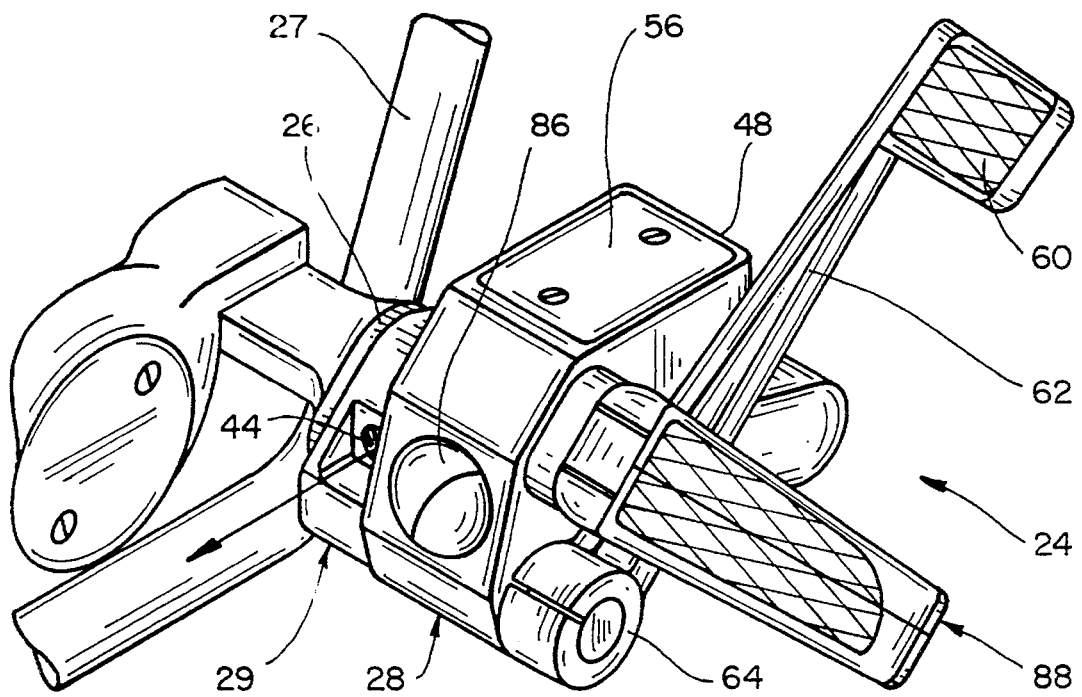
FIG_2

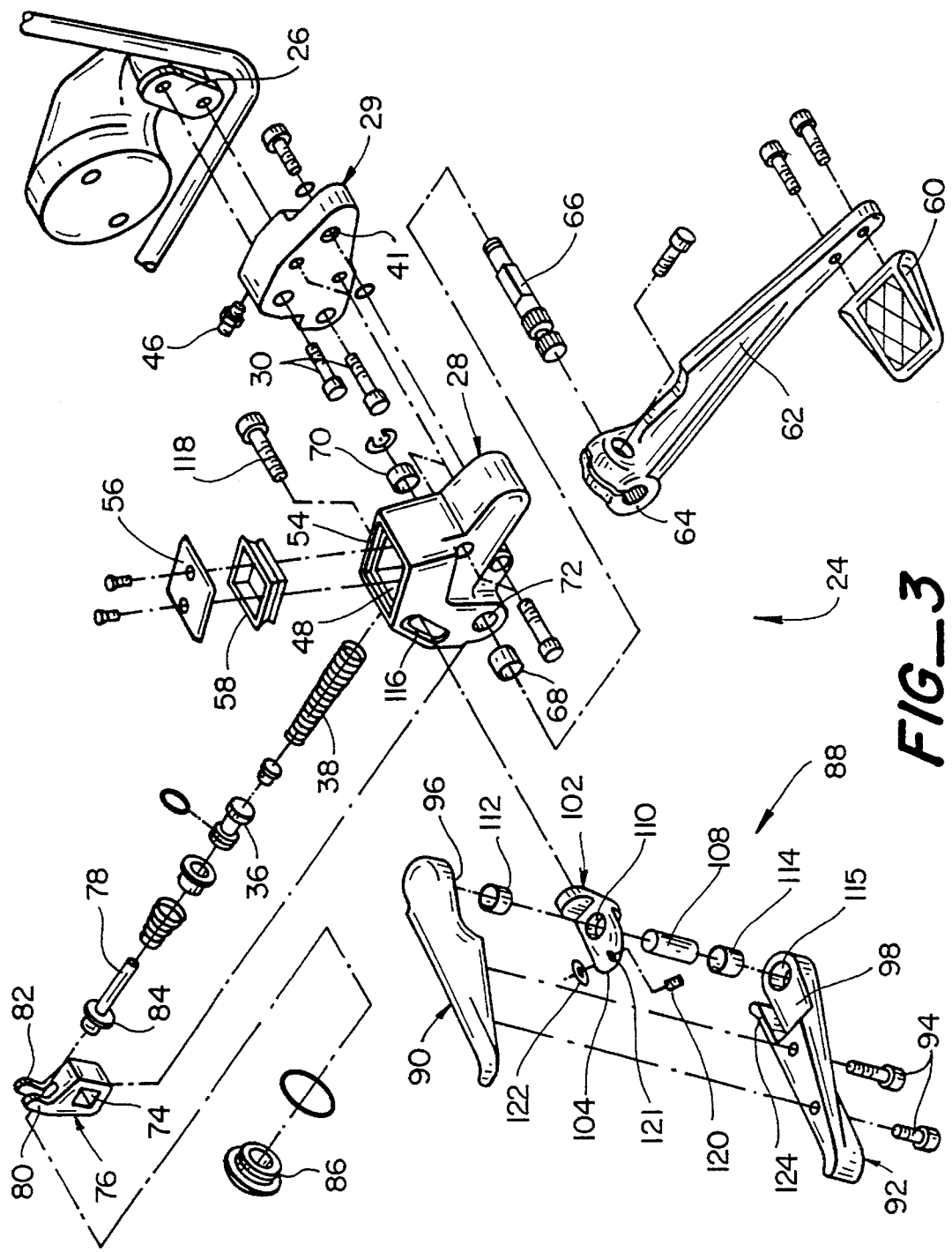
FIG_3

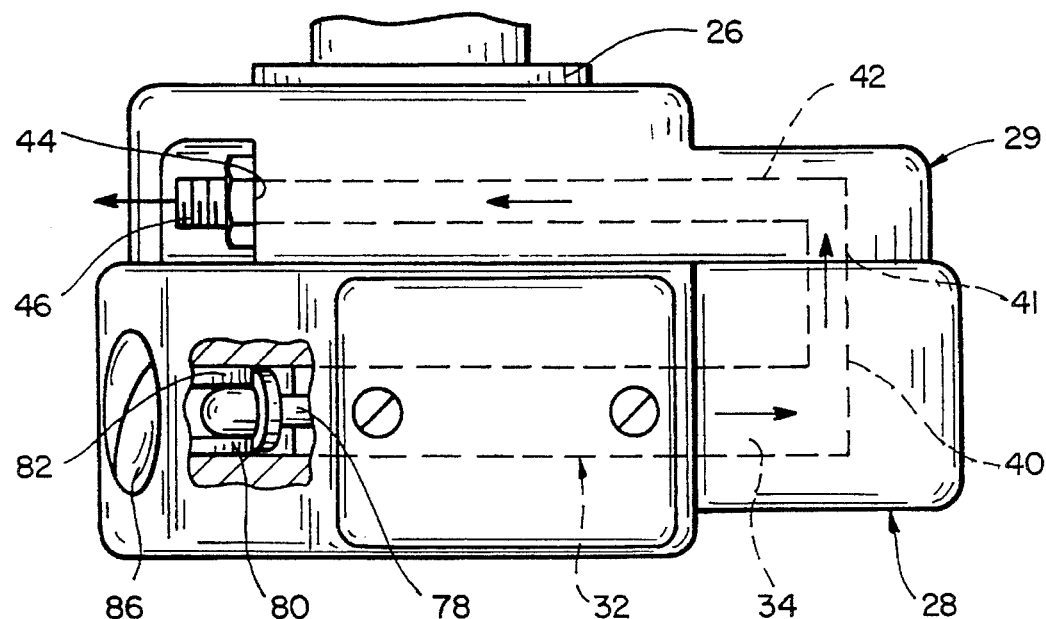
FIG_4
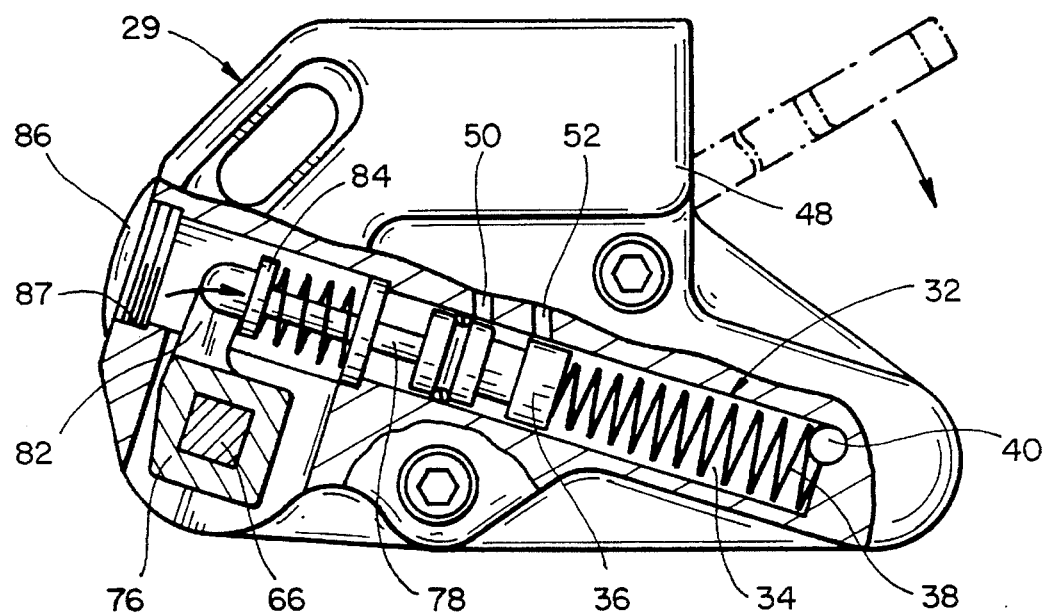
FIG_5

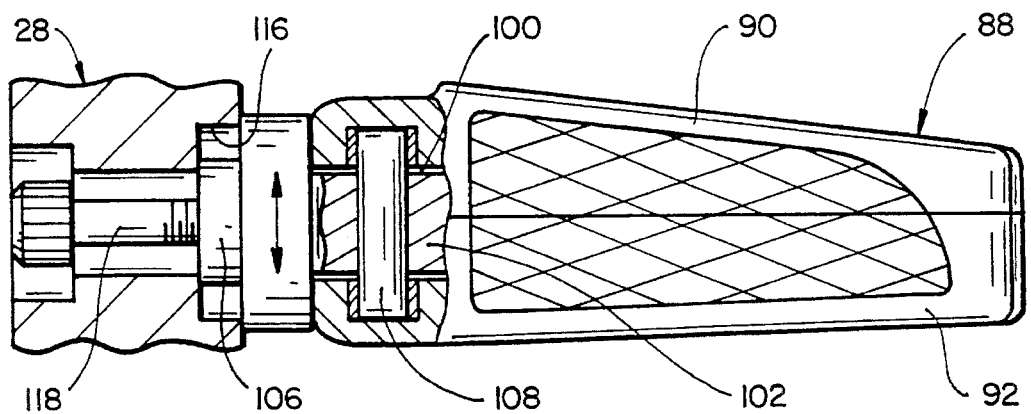
FIG_6
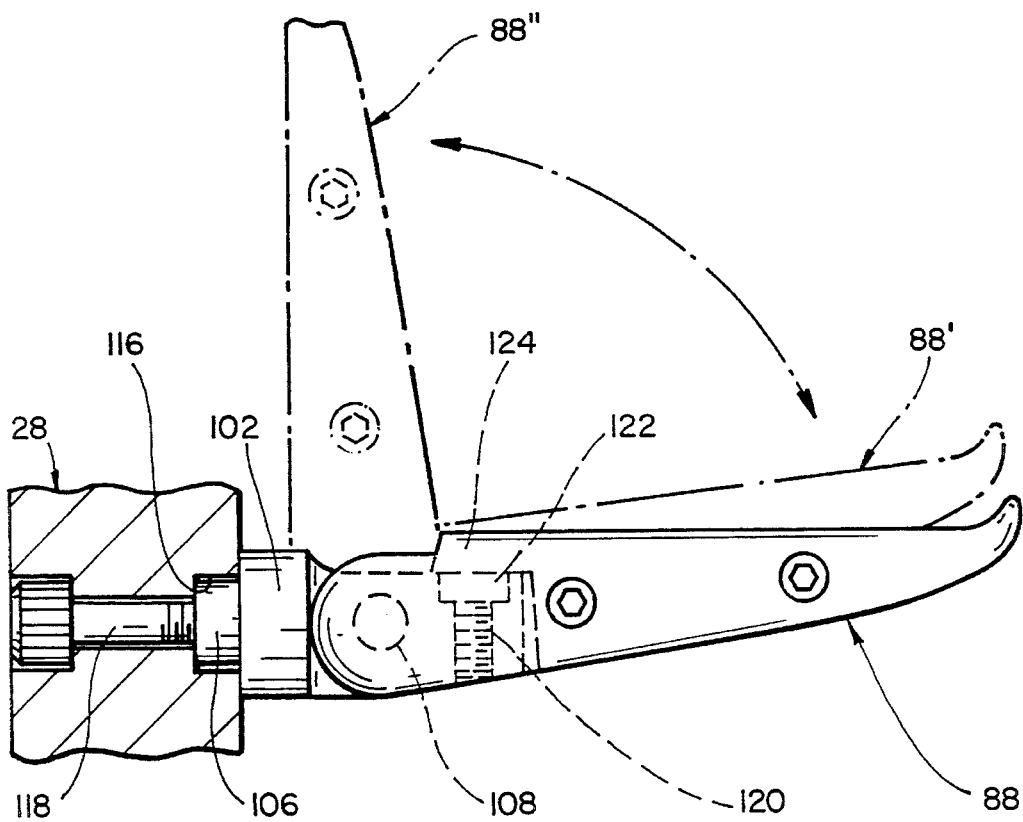
FIG_7

5,476,162

1

FORWARD CONTROL FOR MOTORCYCLE REAR BRAKES

BACKGROUND OF THE INVENTION

1. Field of the Invention

This invention relates in general to motorcycle forward controls. More particularly, the invention relates to a forward control for controlling the rear brakes of a motorcycle.

2. Description of the Related Art

In conventional motorcycles the forward controls for rear brakes are on the right hand side, as shown by the typical prior art forward control 10 of FIG. 1. In this prior art design the motorcycle frame carries a backing plate 12 which separately mounts a brake master cylinder 14, footrest 16, brake pedal 18 and brake actuating linkage 20. An hydraulic brake line 22 is coupled through a fitting 24 at the front of the master cylinder, and the brake line curves forward and then back for directing pressurized brake fluid to the rear brakes. In such an arrangement of parts the brake line is exposed and vulnerable to be damaged or broken off. In addition, the brake line runs close to the engine exhaust pipes from which heat can cause the hydraulic fluid to expand. In some cases the heat is sufficient to expand the fluid to the extent that the brakes are unintentionally applied. In addition to these problems, the exposed brake line is aesthetically unattractive.

The need has been recognized for a forward control for motorcycle rear brakes which obviates the foregoing and other limitations and disadvantages of the prior art. Despite the various motorcycle forward control designs in the prior art, there has heretofore not been provided a suitable and attractive solution to these problems.

SUMMARY OF THE INVENTION

The present invention in general provides a forward control for controlling the rear brakes on motorcycles. The control includes a housing which integrally carries a master brake cylinder. Hydraulic fluid in the cylinder is pressurized by a plunger which is operated by a linkage that is controlled through a foot pedal which is also mounted on the housing. A channel integrally formed in the housing directs pressurized fluid from the cylinder to an outlet at the rear of the housing for coupling with a brake line leading rearwardly to the brakes. The housing is formed with an elongated slideway which mounts a footrest. Provision is made for selectively adjusting the position of the footrest along the slideway for rider comfort. The proximal end of the footrest is mounted for pivotal vertical movement relative to the housing by means of a hinge bracket that fits within the slideway. The angular tilt of the footrest can be selectively varied by means of an adjustment screw which is threadably mounted in the hinge bracket.

Additional objects and features of the invention will appear from the following description in which the embodiments of the invention are described in detail.

BRIEF DESCRIPTION OF THE DRAWINGS

FIG. 1 is a perspective view illustrating a typical prior art forward control for the rear brakes of a motorcycle.

FIG. 2 is a perspective view illustrating a motorcycle rear brake forward control in accordance with a preferred embodiment of the invention.

FIG. 3 is an exploded perspective view of the forward control shown in FIG. 2.

2

FIG. 4 is a partially broken away top plan view of the forward control shown in FIG. 2.

FIG. 5 is a partially broken away side view of the forward control shown in FIG. 4.

FIG. 6 is a partially broken away top plan view of the footrest shown in FIG. 2.

FIG. 7 is a side elevation view showing moved positions of certain components of the footrest shown in FIG. 6.

DESCRIPTION OF THE PREFERRED EMBODIMENTS

FIGS. 2 and 3 illustrate generally at 24 a forward control for motorcycle rear brakes (not shown) in accordance with a preferred embodiment of the invention. The forward control can advantageously be bolted to the existing footpeg bracket 26 which is provided on the right hand side of the motorcycle frame 27.

Forward control 24 is comprised of a housing 28 together with a support body 29 which are attached together and secured to footpeg bracket 26 by means of bolts 30. The housing carries a brake cylinder unit 32 which is comprised of a cylindrical chamber 34 that slidably receives a plunger 36, as best shown in FIG. 5. The longitudinal axis of the chamber extends toward the front end of the motorcycle, and a return compression spring 38 mounted within the cylinder yieldably urges the plunger rearwardly. Forward movement of the plunger compresses the spring while also pressurizing hydraulic fluid in the front end of the chamber.

An outlet port 40 at the front end of chamber 34 is in fluid communication with an inlet port 41 in support body 29. Pressurized fluid is directed through inlet port 41 and into a channel 42 which is integrally formed within the support body. The channel extends transversely inwardly of the support body and makes a right angle turn to the rear. The channel then extends along the length of the support body where it emerges at a rear outlet 44. A fitting 46 provided at this outlet connects with the end of a brake line, not shown, leading to the rear brake assembly. The top portion of the housing has a reservoir 48 for containing a supply of hydraulic fluid. Channels 50, 52 are formed in the housing to communicate fluid between the reservoir and brake cylinder chamber. A square shaped opening 54 in the top of the housing above the reservoir is closed by a cover 56 and sealed by a rubber boot 58.

Brake operating means is provided for operating plunger 36 between its brake-release position, shown in solid line in FIG. 5, and a brake-actuating position at the forward end of the cylinder. The brake operating means comprises a brake pedal 60 carried on the distal end of an actuating arm 62. The proximal end of the actuating arm is in the shape of a hub 64 which is internally splined for connection onto the end of a shaft 66. The shaft is rotatably mounted through bushings 68, 70 that are mounted in an opening 72 which is formed transversely through the housing. The midspan of shaft 66 is square in cross section.

Shaft 66 fits within a square shaped opening 74 formed in a clevis-shaped lever 76 which operates a push rod 78 and the plunger 36. The upper end of lever 76 is bifurcated into a pair of spaced-apart push fingers 80, 82 (FIGS. 3 and 4). The tips of the push fingers are rounded and are positioned to apply thrust forces against a flat circular washer-like structure 84 formed on the outer end of the push rod. The inner end of the rod is positioned in force-transmitting relationship against plunger 36. The lever fingers are positioned on opposite of the thrust action axis of the rod and plunger so that the thrust forces which they apply against structure 84 are substantially balanced in magnitude along the length of the rod and plunger. An end plug 86 is threadably mounted into an opening 87 at the rear end of housing 28 to provide access into the housing for servicing and/or repair of the hydraulic cylinder components.

Forward control 24 includes a footrest unit 88 which is mounted on the housing at a position vertically above and aft of brake actuating arm 62. Footrest 88 is comprised of first and second sub-components 90, 92 which are mounted together by means of a pair of bolts 94 (FIG. 3). Each sub-component is formed at its proximal end with an outwardly open partial cavity 96, 98. With the sub-components mounted together, the partial cavities are in face-to-face relationship so that they form a central cavity 100. A hinge bracket 102 is provided and comprises a nose portion 104 that is integral with and projects outwardly from an oblong-shaped slide portion 106. Footrest 88 is mounted for relative pivotal movement with respect to the hinge bracket by means of a pin 108. This pin rotatably fits within an opening 110 which is formed transversely through nose portion 104 of the hinge bracket. Opposite ends of the pin are fitted within bushings 112, 114 which in turn are mounted within circular recesses 116 formed internally at the proximal ends of the footrest sub-components 90 and 92.

Housing 28 is formed on its outer side with a slideway 116 which is elongated along an adjustment axis that inclines in a generally forward and upward direction of the motorcycle. Oblong slide portion 106 of the hinge bracket fits within slideway 116, and a bolt 118 is provided to fasten the hinge bracket at a selected position along the slideway. This permits the position of the footrest to be adjusted up and down in accordance with rider comfort.

FIG. 7 illustrates in solid line the outwardly extending position of footrest 88. The footrest can be selectively folded up by the rider pivoting it about pin 108 to the vertical position shown in the phantom view at 88" of FIG. 7. Adjustment means is provided for selectively adjusting the relative angular relationship between the hinge bracket and footrest for adjusting the angular orientation of the footrest relative to the motorcycle when the footrest is folded down. This adjustment means comprises a screw 120 which is threadably mounted in a hole 121 formed through the tip of bracket nose portion 104. A flat circular washer 122 seated at the upper end of the screw forms a limit stop which contacts ribs 124 which are formed at the upper ends of the footrest sub-components 90 and 92. The lower end of screw 120 is formed with an internal keyway for accepting a suitable tool, such an Allen head wrench, for use by the rider to turn the screw so that it can be selectively advanced or retracted in the hinge bracket. By this means the limit stop formed by washer 122 is raised or lowered so that the limit of downward pivotal movement of the footstop can be varied, for example to the position shown at 88' in FIG. 7. This permits the motorcycle rider to adjust the angle of tilt of the footrest for rider comfort by providing a more natural orientation for supporting the rider's foot.

It will be seen from the foregoing that there has been provided a new an improved forward control for motorcycle rear brakes. The forward control incorporates the hydraulic cylinder components, brake pedal actuating linkage and footrest in an integral unit having an internal channel for directing pressurized brake fluid to the rear, thereby obviating the problems inherent in the exposed forwardly directed brake lines of prior art forward control designs. In the invention the actuating linkage includes a clevis-shaped lever for operating the cylinder rod and plunger so that operating thrust forces are evenly balanced along the thrust axis of the plunger. The invention provides convenient means for mounting the footrest onto the housing of the forward control which facilitates both up and down as well as transverse tilting adjustments for rider comfort. By removing the existing footpeg on a motorcycle, the forward control can be mounted directly on the footpeg bracket, thereby eliminating the requirement of providing a separate mounting plate on the motorcycle frame.

While the foregoing embodiments are at present considered to be preferred it is understood that numerous variations and modifications may be made therein by those skilled in the art and it is intended to cover in the appended claims all such variations and modifications as fall within the true spirit and scope of the invention.

What is claimed is:

1. A forward control for use in controlling the rear brakes on a motorcycle having front and rear ends, the forward control comprising the combination of a housing, an hydraulic brake cylinder unit carried in the housing, said brake cylinder unit comprising a cylindrical chamber for containing brake fluid, said chamber having a longitudinal axis for extending toward the front end of the motorcycle, a plunger mounted for movement within the chamber along a thrust axis between a brake-actuating direction for pressurizing brake fluid contained in the chamber and a brake-release direction, a reservoir for containing a supply of brake fluid, inlet port means for directing brake fluid between the supply reservoir and chamber, outlet port means for directing pressurized brake fluid out of the chamber responsive to movement of the plunger in said brake-actuating direction within the chamber, support means for supporting the housing on a lateral side of the motorcycle, the support means comprising a support body, channel means in the support body for directing pressurized brake fluid along a channel from the outlet port means in a direction toward the rear brakes, a brake pedal having an actuating arm mounted on the housing for pivotal movement between a brake-actuating position and a brake-release position, and operating means for operating the plunger between said brake-actuating and brake-release directions responsive to movement of the actuating arm of the brake pedal between respective brake-actuating and brake-release positions.

2. A forward control as in claim 1 in which said thrust axis is longitudinal of the plunger, and further characterized in that the operating means comprises a lever carried by the housing for pivotal movement responsive to said pivotal movement of the actuating arm, the lever having an end which is bifurcated into a pair of spaced-apart push fingers, a force-receiving structure carried by the plunger, and means for positioning the bifurcated end of the lever in relation to the plunger so that the push fingers in response to said pivotal movement of the actuating arm toward its brake-actuating position apply thrust forces against the force-receiving structure along respective axes which are on opposite sides of said thrust axis of the plunger whereby the thrust forces are substantially evenly balanced in magnitude along the length of the plunger.

3. A forward control as in claim 1 in which the motorcycle includes a brake line for supplying pressurized brake fluid to the rear brakes, the forward control further characterized in that the support body has a rear end for extending toward the rear end of the motorcycle, and said channel having an inlet end in communication with said outlet port and an outlet end which emerges from the rear end of the support body for connection with the brake line.

4. A forward control as in claim 1 which includes a footrest carried by the housing, said housing being formed with a slideway which is elongated along an adjustment axis, and means for mounting the footrest on the housing at selected positions along the adjustment axis whereby the position of the footrest relative to a rider on the motorcycle can be varied.

5. A forward control as in claim 4 in which the footrest comprises first and second sub-components, each sub-component having a proximal end which is formed with an outwardly opening partial cavity, means for mounting the sub-components together to form a footrest body and with the partial cavities being in face to face relationship to form a central cavity, a hinge bracket mounted on the housing, means for mounting the footrest body on the hinge bracket for relative pivotal movement about a transverse axis through a predetermined angular arc of travel toward and away from a limit stop position, and adjustment means for selectively adjusting the limit stop position of the footrest body along said arc of travel for adjusting the lateral angular orientation of the footrest relative to the motorcycle.

6. A forward control as in claim 5 in which said hinge bracket has a nose portion which projects into the central cavity of the footrest body, and said adjustment means comprises an adjustment screw threadably mounted on said nose portion of the hinge bracket at a position which is offset from said transverse axis, and means positioned in supporting relationship between said footrest body and screw for defining said limit stop whereby the adjustment screw can be selectively advanced or retracted in the hinge bracket for adjusting the limit stop position.

\* \* \* \* \*